Figure 1:
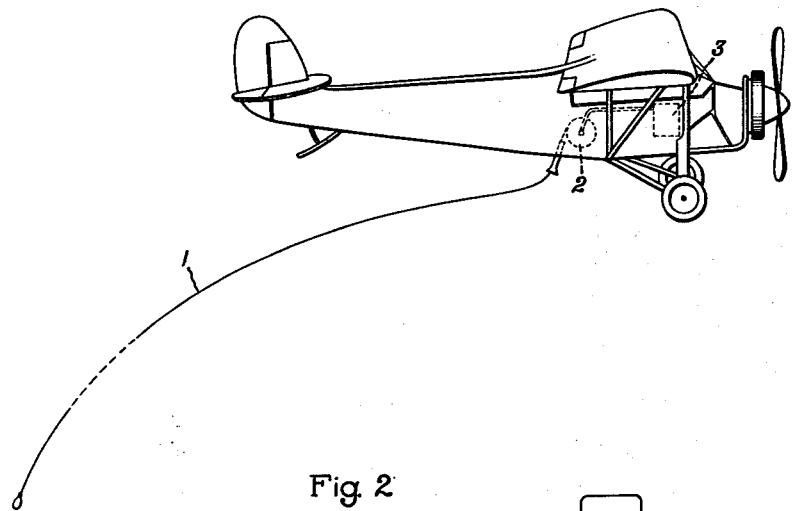

Nov. 26, 1935.　　　F. G. PATTERSON　　　2,022,517
RADIO ECHO ALTIMETER
Filed June 25, 1931

OSCILLATOR NORMALLY
RESONATES AT A FREQUENCY
SLIGHTLY DIFFERENT FROM
NATURAL FREQUENCY OF ANTENNA

Inventor:
Franklin G. Patterson,
by Charles E. Tullar
His Attorney.

Patented Nov. 26, 1935

2,022,517

UNITED STATES PATENT OFFICE 2,022,517

RADIO ECHO ALTIMETER

Franklin G. Patterson, Schenectady, N. Y., assignor to General Electric Company, a corporation of New York Application June 25, 1931, Serial No. 546,833

14 Claims. (Cl. 250—1)

My invention relates to radio echo altimeters for use on aircraft for determining the altitude of the craft above the earth and it has for one of its objects to provide an altimeter of the radio echo type which is of simplified construction, and of increased reliability.

In copending application, Serial No. 319,989, filed November 17, 1928 by E. F. W. Alexanderson, and which is assigned to the same assignee as my present application, is disclosed an altimeter of the radio echo type. This altimeter comprises an oscillation generator arranged to produce oscillations having a frequency determined by the constants of an oscillatory circuit associated therewith, which oscillatory circuit comprises an antenna arranged to radiate oscillations from the craft toward the earth and to receive said oscillations after reflection from the earth. As thus arranged the frequency of oscillations produced is caused to vary cyclically as the craft changes in altitude, the amplitude of this cyclical variation being dependent upon the altitude of the craft above the earth.

Means are also shown whereby these cyclic variations in frequency are caused to produce corresponding indications from a suitable indicating device, this means involving the idea of producing a heterodyne beat note between the oscillations of the cyclically varying frequency and other oscillations of constant frequency. This beat note is then supplied to a frequency discriminating circuit and rectified and caused to control the indicating device.

While systems of this type operate very satisfactorily for determination of altitude one of the objects of my invention is to provide means whereby the indication of altitude is produced without resorting to any use of the heterodyne beat principle thereby avoiding the necessity for an independent source of oscillations and other equipment necessary to the use of that principle.

Still a further object of my invention is to provide means whereby the oscillations excited in the antenna are caused to vary in amplitude as the craft changes in altitude, the amplitude of these variations being sufficiently great to permit their translation directly into indications of altitude.

It has been long recognized that an antenna of the quarter wave, or half wave doublet type, for example, when operated independently of the influence of any reflector has a certain definite radiation resistance. When such an antenna is brought within the influence of a reflecting surface, however, it has been found that its radiation resistance changes and that it varies cyclically with respect to the distance between the antenna and the reflecting surface. Thus if it be assumed that the antenna is arranged upon an aircraft above the earth so that the waves radiated therefrom are reflected from the earth, it will be found that the radiation resistance of the antenna varies cyclically with changes in altitude of the craft. Due to this cyclical variation in radiation resistance of the antenna, the antenna constitutes a cyclically varying load upon a source from which it is supplied with oscillations to be radiated. In accordance with my invention I utilize this variation in radiation resistance in the antenna carried by an aircraft to produce a cyclical variation in amplitude of the oscillations supplied thereto whereby the intensity of these oscillations may be utilized directly to produce an indication of altitude.

Thus, a further object of my invention is to provide an oscillation generator for exciting the antenna of a radio echo altimeter in which the intensity of oscillations produced is sensitively responsive to the radiation resistance of the antenna.

Still a further object of my invention is to provide a novel method of utilizing such an oscillator for determining altitudes.

Figure 2:
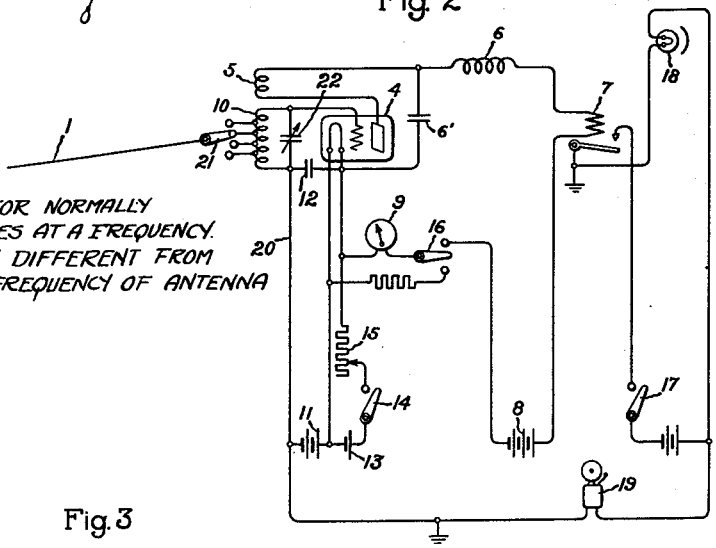
Figure 3:
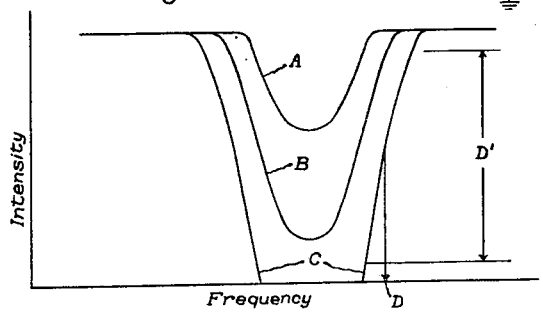

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 shows an aircraft equipped with my invention; Fig. 2 shows a circuit diagram of the equipment employed; and Fig. 3 shows certain characteristics thereof.

Referring to the drawing, Fig. 1 represents an air craft having a trailing antenna 1 suspended therefrom, this antenna being arranged to be reeled in and out by means of a reel 2. This antenna, which is preferably of the quarter wave type, is connected with the associated equipment for indicating the altitude, this equipment being located in the cockpit, if desired, as indicated at 3 in the drawing.

In Fig. 2 I have shown a circuit diagram of the equipment employed. This equipment comprises an electron discharge oscillation generator 4 having an anode circuit comprising feedback coil 5, radio frequency choke coil 6, winding of a relay 7, source of anode potential 8 and a meter 9. A radio frequency by-pass condenser 6' is connected between the cathode and the anode side of choke coil 6. The discharge device is also provided with a grid circuit comprising a tuned oscillatory circuit 10 and a source of biasing potential 11, the latter of which is short circuited with respect to high frequency oscillations by means of a condenser 12. The cathode of the electron discharge device is energized from a source of potential 13 through a switch 14 and a resistance 15. The meter 9 is arranged to be connected by means of a switch 16 either in the anode circuit thereby to indicate the variations in the anode current or in shunt with the cathode of the discharge device thereby to indicate the voltage of the cathode. Preferably this meter is one in which the zero reading corresponds to the minimum value of anode current which occurs during operation of the system.

In the operation of the system the circuit 10, which may be coupled to the anode circuit in any desired way but which is shown as inductively coupled thereto, is tuned to a desired frequency, whereby the system is adjusted to operate on a portion of its characteristic presently to be indicated. Oscillations are then radiated from the antenna 1 toward the earth. Both the intensity and the frequency of the oscillator are caused to vary due to the effect of the reflected waves upon the antenna 1 and as a result the current in the anode circuit of the oscillator cyclically varies in magnitude, the amplitude of these cyclic variations diminishing as the craft increases in altitude. Thus the altitude may be determined from the indications of the meter 9 when connected in the anode circuit. Contacts of the relay 7 are so connected that when the anode current in the relay increases to a certain value it closes a circuit through switch 17 for suitable indicating devices, such as a lamp 18 and a bell 19, whereby the operator is informed that he has attained a certain predetermined altitude.

To explain the operation of the system in somewhat greater detail, however, it is pointed out that the oscillation generator is tuned in accordance with the natural period of the circuit 10. This circuit, however, is directly connected to the quarter wave antenna 1 having a natural period of oscillation. Thus the circuit of the antenna may be considered to comprise the antenna 1, capacitance between the antenna 1 and the craft, together with that portion of the inductance of the circuit 10 which is between the grounding conductor 20 and the switch 21. Thus the system comprises two oscillatory circuits, one comprising the circuit 10 and the other the circuit of the antenna, these circuits being coupled together by means of the lower portion of the inductance of the circuit 10.

In accordance with my invention I adjust the circuit 10 to oscillate at a frequency slightly different from the natural period of the antenna 1 thereby to produce certain effects which may best be explained with reference to Fig. 3 in which the amplitude of the oscillations produced in the system are plotted as ordinates against the frequency of oscillations produced as abscissa. Thus if we consider the system as unaffected by the reflected waves, and vary the capacitance of condenser 22 it will be found that the amplitude of oscillations produced will remain constant except over a certain range where it will rapidly drop and then again increase as indicated by the curves A, B, and C, these curves representing the effect produced with different degrees of coupling of the circuit 10 either to the antenna 1 or to the feed-back coil 5. The valley which is produced in the curves occurs in that range of adjustment of the condenser 10 in which the two oscillatory circuits are in resonance. Thus, for example, when the two circuits are in resonance the antenna 1 constitutes an increased load upon the oscillator, thereby greatly affecting the amplitude of the oscillations produced. As the capacitance of condenser 22, however, is varied in either direction from the natural period of the antenna, the load on the oscillator is reduced thereby causing the amplitude to again increase and assume a constant value. The depth of the valley is of course dependent upon the stability of the oscillator and the degree of coupling between the circuit 10 and the circuit of antenna 1. Thus, for example, if we assume a relatively close coupling between the feed-back coil 5 and the inductance of the circuit 10, thereby causing the system to operate with comparative stability, and a relatively loose coupling between the two circuits as by moving the switch 21 to its lower position, it will be found that the intensity of oscillations produced varies in a relatively small amount as the tuning of the condenser is varied over the range in which the two circuits are in resonance. The curve A may be considered to represent the variation which occurs with the system so adjusted. If, however, the coupling between feed-back coil 5 and the inductance of the tuned circuit 10 is relatively loose thereby to reduce the stability of the oscillator, whereas the coupling between the two oscillatory circuits is relatively close as by operating the switch 21 to one of its upper positions, then the change in intensity of oscillations is very great as the tuning condenser 22 is varied over the range in which the two circuits are in resonance. This of course is due to the fact that the oscillator due to the loose feed-back coupling is relatively weak and becomes heavily loaded by the antenna which is closely coupled thereto. The curve B, or C, for example, may be considered to represent the operation of the system when so adjusted.

While any desired degree of coupling between the circuit 10 and the antenna 1 and the feed-back coil 5 may be employed, I preferably adjust the circuit in such a way that as the condenser 22 is adjusted over the range in which the two circuits are in resonance the intensity of the oscillations produced rapidly diminishes and finally the system stops oscillating altogether. Curve C represents the operation of the system when so adjusted. If we assume now that the system is adjusted for operation in accordance with the curve C, for example, and that the condenser 22 is adjusted at a fixed point corresponding for example to the point D, this point falling on the steep slope of the curve C, the intensity of the oscillations produced is then sensitively responsive to the load upon the oscillator. Since the antenna carried by the craft is subject to the influence of the waves reflected from the earth its radiation resistance varies cyclically in the manner above described and accordingly the antenna constitutes a cyclically varying load upon the oscillator as the craft changes in altitude. Accordingly, the intensity of oscillations produced may vary over a very broad range, as for example, between the limits indicated at D'.

In the adjustment of the system the position of the condenser 22 may be so chosen that the system operates upon either slope of the characteristic described. I have found, however, that much better operation may be had upon one of the slopes of the characteristic than upon the other. This is due to the fact that not only the intensity of oscillations produced is subject to variation in response to variation in the radiation resistance of the antenna, but the frequency of the oscillations produced is also subject to variation due to this change in radiation resistance. This frequency variation also causes a change in load upon the oscillator and a resultant change in intensity of oscillations produced. With condenser 22 adjusted for operation upon one slope of the curve these two effects, namely, the variation in intensity due directly to the variation in radiation resistance, and the variation in intensity due to variation in load resulting from frequency variation, are cumulative whereas on the opposite slope of the curve they are opposing.

Thus, to explain further, let us assume that the condenser 22 is adjusted to cause the system to oscillate at a frequency higher than the natural frequency of the antenna, as for example, on the right hand slope of the curve and that the oscillator is one in which the frequency of oscillations produced reduces as the load increases. Under these conditions it will be observed that as the radiation resistance increases the intensity of oscillations is diminished due to the direct effect of the increased load, and also the frequency approaches the natural frequency of the antenna thereby still further increasing the load and causing a still greater diminution in intensity of oscillations produced. Now if we assume that the oscillator is tuned to a corresponding point on the left hand slope of the curve, then the decrease in frequency with increased radiation resistance is in the direction of a greater departure from the natural frequency of the antenna and therefore causes a lessening of the load. Thus the frequency shift in this case opposes the direct effect of change in radiation resistance in loading the oscillator and producing variations in intensity. Thus for best operation, the oscillator should be adjusted to oscillate at a frequency on that side of the natural frequency of the antenna in which the shift in frequency of the oscillator with increased load is in the direction of the natural frequency of the antenna. I have normally operated the oscillator at a frequency higher than the natural frequency of the antenna.

During operation of the system in accordance with curve C it will be observed that upon a certain increase in load on the oscillator, which may occur at a predetermined altitude, the oscillator ceases functioning. If desired the frequency of the oscillator may then be varied in the direction of greater departure from the natural frequency of the antenna. The load on the oscillator is thus reduced and the system again oscillates. With the condenser adjusted in this new position altitude determinations may be made at lower altitudes and even those low altitudes where the variation is progressive. Operation of this kind is more fully described in copending application, Serial No. 353,513 of E. F. W. Alexanderson, filed April 8, 1929, entitled Method and means for indicating altitude from aircraft, and which is assigned to the same assignee as my present application. A similar effect may be produced by increasing the ability of the oscillator to operate under load as by increasing the coupling between the plate and grid circuits, for example. Thus if the system is adjusted for operation on curve C and reaches an altitude at which oscillations cease by increasing the coupling between the plate and grid circuits the system may be made to operate at the same frequency but in accordance with curve B. Altitude determinations may then be made at lower altitudes in accordance with curve B.

While it will be understood that many different means may be employed to indicate the intensity of oscillations produced it has been found that with the system arranged as described very satisfactory indications are produced by the meter 9 connected in the anode circuit of the discharge device. The anode current in the discharge device is, of course, controlled in accordance with the intensity of oscillations produced on the grid 5 and accordingly this current serves as a very satisfactory measure of the intensity of oscillations produced.

While I have shown a particular embodiment of my invention it will of course be understood that I do not wish to be limited thereto since many modifications may be made both in the circuit arrangement and in the instrumentalities employed without departing from the spirit and scope of my invention as set forth in the appended claims.

What I claim as new and desire to secure by Letters Patent of the United States, is,—

1. The combination, in an altitude indicating device for aircraft, of an antenna having a natural period, said antenna being arranged to radiate oscillations from the craft toward the earth, an oscillation generator having an oscillatory circuit coupled to said antenna whereby said antenna constitutes a varying load upon said oscillator, said oscillatory circuit being resonant at a frequency sufficiently different from the natural frequency of the antenna that as said antenna characteristics vary with change in altitude of the craft the changes in load on said oscillation generator produced by said antenna are markedly increased by said difference in resonant frequency of said circuit and natural frequency of the antenna, means to adjust said oscillator for unstable operation under said variation in load, and means responsive to the intensity of oscillations produced by said generator.

2. The combination, in an altitude indicating device for aircraft, of an antenna having a natural period, said antenna being arranged to radiate oscillations from said craft toward the earth, an oscillation generator having an oscillatory circuit coupled to said antenna and resonant at such a frequency, different from the natural frequency of the antenna, that the variation in radiation resistance of the antenna and the resultant change in frequency of the oscillations produced act cumulatively to vary the intensity of said oscillations, and indicating means responsive to the intensity of said oscillations.

3. In an altitude indicating device for aircraft, an electron discharge device, a regenerative circuit therefor tuned to a certain frequency, a radiating circuit coupled to said regenerative circuit and having a natural frequency differing by an amount, relative to the degree of coupling between said circuits, substantially to increase the changes in load on said regenerative circuit caused by the effect of changes in altitude of the craft upon said radiating circuit, means to adjust said regenerative circuit for unstable operation under said changes in load, and indicating means responsive to the intensity of oscillations produced in said electron discharge device.

4. The combination, in an altitude indicating device for aircraft, an antenna having a natural frequency of oscillation, an oscillation generator coupled to supply oscillations having a certain normal frequency thereto, said generator being unstable in operation with respect to frequency and intensity of oscillations produced with varying load, and said normal frequency being slightly different from said natural frequency of said antenna and on the side of said natural frequency in which the shift in frequency with increased load is in the direction of said natural frequency.

5. The method of utilizing an oscillation generator having coupled plate and grid circuits for determining altitude from aircraft which includes radiating oscillations from the craft toward the earth and impressing the wave reflected from the earth back upon the oscillation generator whereby the intensity of oscillations produced varies cyclically as the craft changes in altitude and utilizing a certain degree of coupling between said plate and grid circuits in a certain predetermined range of altitudes and a different degree of coupling between said plate and grid circuits in a different predetermined range of altitudes.

6. The combination, in an altitude indicating system for aircraft, of an antenna having a natural period, said antenna being arranged to radiate oscillations from the craft toward the earth, an oscillation generator having an oscillatory circuit resonant at a frequency different from the natural frequency of said antenna, and means whereby said antenna constitutes a widely varying load on said oscillation generator as the craft changes in altitude, said means including a coupling between said antenna and oscillatory circuit, and means for rendering said oscillation generator unstable in operation under influence of said varying load.

7. The combination, in an altitude indicating system for aircraft, of an antenna having a natural period, said antenna being arranged to radiate oscillations from the craft toward the earth, an oscillation generator having an oscillatory circuit resonant at a frequency different from the natural period of said antenna, means whereby said antenna constitutes a widely varying load on said oscillation generator as the craft changes in altitude, said oscillation generator being unstable in operation under influence of said varying load, and means for changing the degree of stability of said oscillator at different altitudes.

8. The method of utilizing an oscillation generator having coupled plate and grid circuits for determining altitude from aircraft which includes radiating oscillations from the craft toward the earth and impressing the wave reflected from the earth back upon the oscillation generator whereby the intensity of oscillations produced varies cyclically as the craft changes in altitude and adjusting said oscillation generator for operation with a certain degree of stability when used in a certain predetermined range of altitudes and for a different degree of stability when used in a different predetermined range of altitudes.

9. The method of utilizing an oscillation generator coupled to an antenna and having coupled plate and grid circuits to determine the altitude of aircraft, which includes determining the altitude from the cyclic variations which occur in the oscillations produced by said oscillation generator as the craft changes in altitude, and during said cyclic variations having said oscillation generator adjusted to resonate at a frequency normally slightly different from the natural frequency of said antenna, whereby the antenna constitutes a widely varying load.

10. The method of utilizing an electron discharge oscillation generator, coupled to an antenna having a natural frequency, to determine the altitude of aircraft, which includes determining the altitude from the cyclic variations in the oscillations supplied to said antenna when the craft changes in altitude, and during said cyclic variations, having said oscillation generator tuned to such a condition different from the natural frequency of the antenna that variation in radiation resistance of the antenna and the resultant change in frequency of oscillations produced act cumulatively to increase said cyclic variations.

11. The method of utilizing an oscillation generator, supplying oscillations having a certain normal frequency to an antenna having a natural frequency of oscillation, to determine altitudes from aircraft, which includes having said oscillation generator, during the determination of altitudes, in an unstable condition with respect to frequency and intensity of oscillations produced with varying load, and having said oscillation generator adjusted to produce oscillations having a frequency slightly different from said natural frequency of said antenna and on the side of said natural frequency in which the shift in frequency with increased load is in the direction of said natural frequency.

12. The method of utilizing an electron discharge oscillation generator coupled to an antenna having a certain natural frequency in the determination of altitude of aircraft carrying said antenna, which includes adjusting said oscillation generator for such unstable operation that as the tuning means of said oscillation generator is varied through resonance with the natural frequency of the antenna oscillations cease over a certain range of adjustment of said tuning means, and determining the altitude with said tuning means adjusted at one side of said range and sufficiently removed from the center thereof that oscillations are produced with intensity which is sensitive to variations in said antenna.

13. The method of utilizing an electron discharge oscillation generator coupled to an antenna having a certain natural frequency in the determination of altitude of air craft carrying said antenna, which includes adjusting said oscillation generator for such unstable operation that as the tuning means of said oscillation generator is varied through resonance with the natural frequency of the antenna the oscillations produced reduce in amplitude to a minimum and then again increase in amplitude, thereby producing a distinct valley in the tuning position-amplitude characteristic of said oscillation generator, and determining the altitude with the tuning means adjusted approximately centrally of one side of said valley.

14. The method of utilizing an oscillation generator coupled to an antenna and having coupled plate and grid circuits to determine the altitude of aircraft, which includes determining the altitude from the cyclic variations which occur in the oscillations produced by said oscillation generator as the craft changes in altitude and during said cyclic variations having said oscillation generator adjusted to resonate at a frequency normally slightly different from the natural frequency of said antenna and adjusted for unstable operation under the widely varying loads produced by said antenna as the craft changes in altitude.

FRANKLIN G. PATTERSON.